United States Patent [19]

French et al.

[11] 3,860,139

[45] Jan. 14, 1975

[54] PASSENGER AUDIO CONTROL BOX

[75] Inventors: Alan French, Warwick, R.I.; Joseph Machado, Attleboro, Mass.

[73] Assignee: Avid Corporation, East Providence, R.I.

[22] Filed: Nov. 1, 1973

[21] Appl. No.: 411,783

[52] U.S. Cl. .................... 220/3.5, 220/4 R, 174/53
[51] Int. Cl. ............................................ H02g 3/08
[58] Field of Search ............ 220/4 R, 3.5, 3.6, 3.92, 220/3.94; 174/52 R, 53, 58

[56] References Cited
UNITED STATES PATENTS

| | | | |
|---|---|---|---|
| 2,881,940 | 4/1959 | Hamilton | 220/3.94 |
| 3,083,857 | 4/1963 | Clark | 220/3.94 |
| 3,564,112 | 2/1971 | Algotsson | 220/3.92 |

*Primary Examiner*—William I. Price
*Assistant Examiner*—Steven M. Pollard
*Attorney, Agent, or Firm*—William Frederick Werner

[57] ABSTRACT

This invention relates to a passenger audio control box such as found in the arm of a bus or airplane seat, whereby the passenger selects one of several offered musical programs, and relates to a structure for removably securing the control box in the arm of the passenger seat.

5 Claims, 9 Drawing Figures

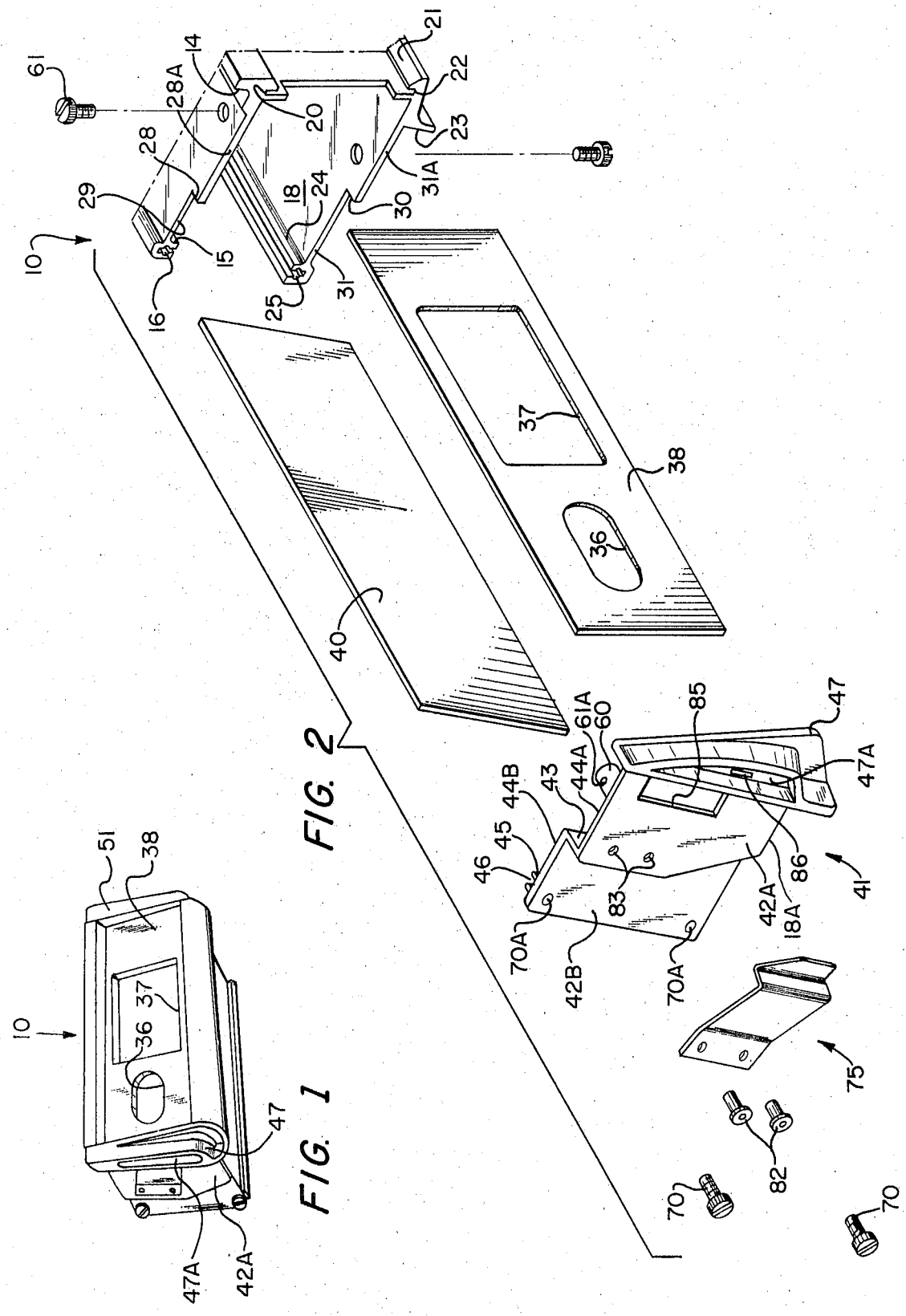

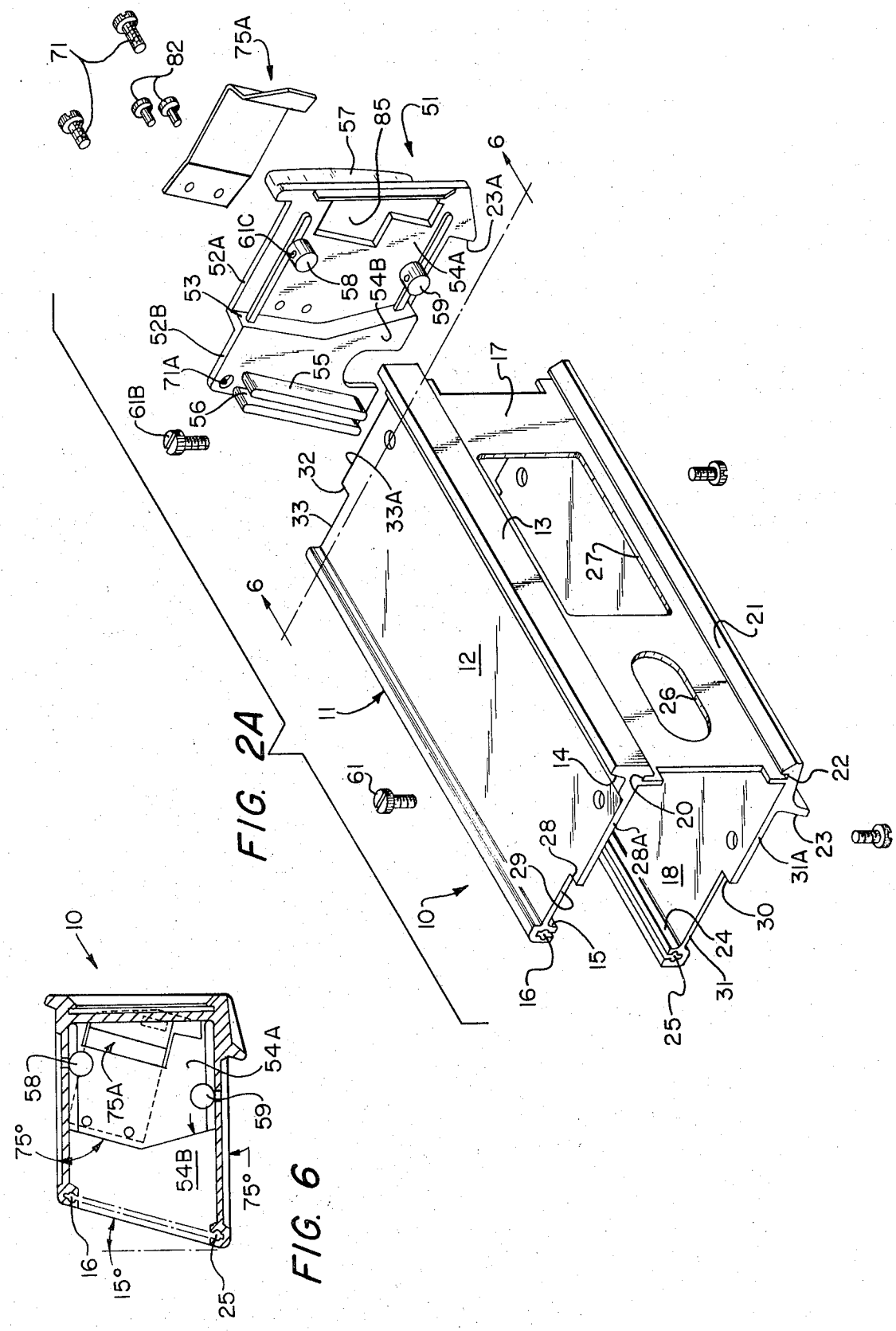

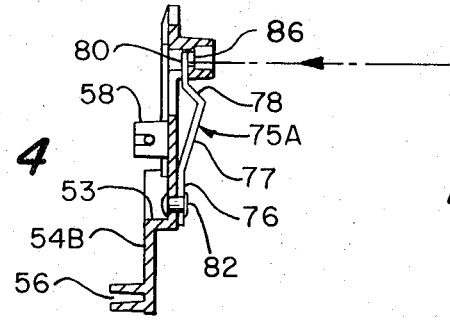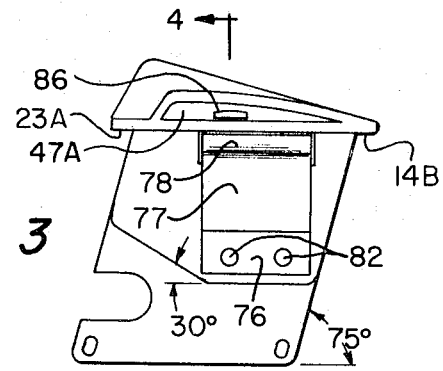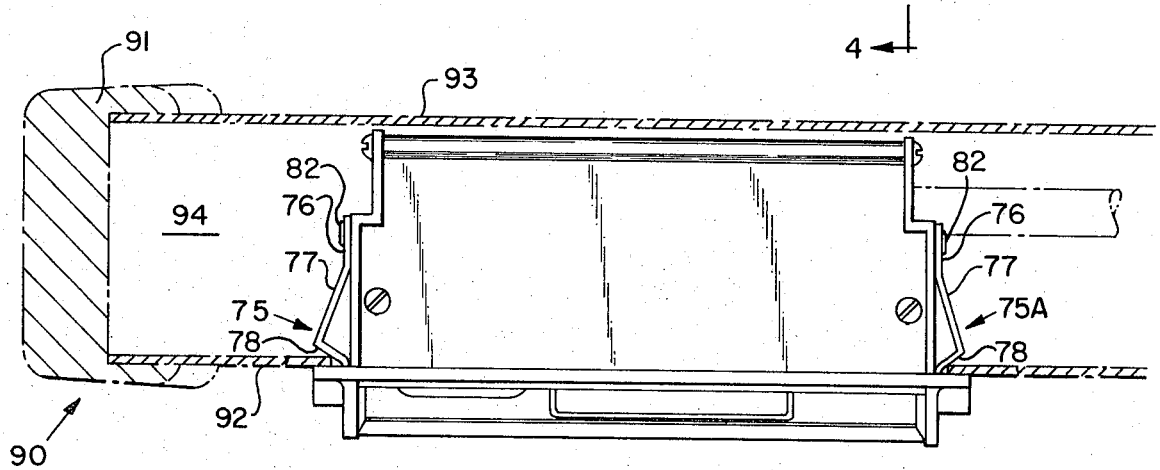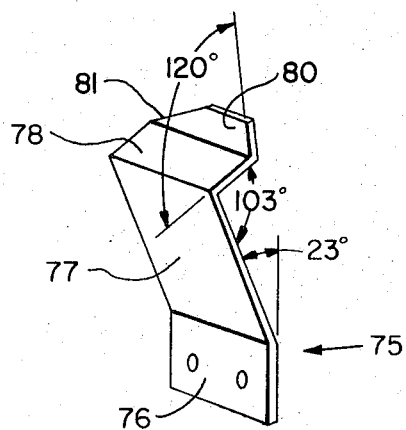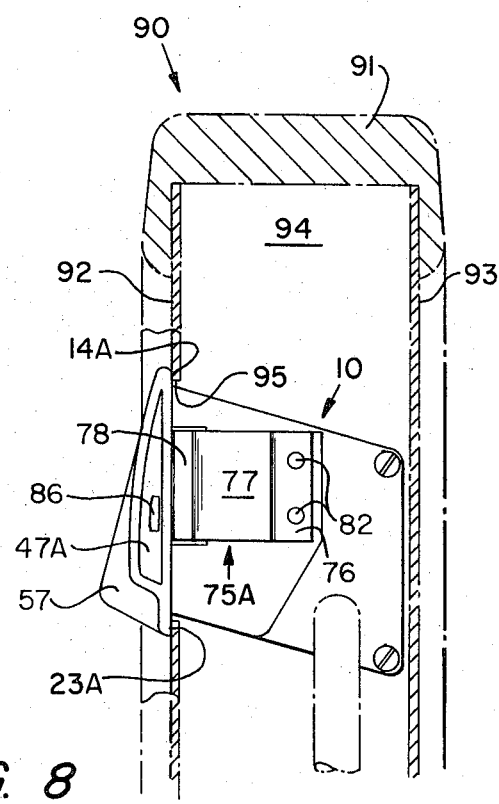

PASSENGER AUDIO CONTROL BOX

STATEMENT OF INVENTION

This invention relates to a passenger audio control box for use in the arm of an airplane passenger seat and move particularly, to a box structure having structural features whereby, the control box can be removably secured in the arm of of the passenger seat.

PRIOR ART

It is necessary to remove the passenger audio control box located in the arm of a passenger bus or airplane seat for servicing, channel control changes and for other reasons. In considering the number of seats in an airplane, it becomes obvious if screw or other semipermanent mechanical means are employed, it becomes a costly time consuming operation to remove the screws and the box and to replace the same. In prior constructions where a snap-in type of box structure was employed, the plug or jack plugged into the control box, would pull the control box out of the seat arm, when it was necessary to remove the jack.

The present passenger audio control box embodies a construction wherein, the control box may be removably secured in the arm of a passenger seat, in a manner, overcoming the disadvantages of prior structures.

OBJECTS OF THE INVENTION

Hence, it is a principal object of the present invention to provide an inexpensive passenger audio control box especially adapted for use in bus or airplane passenger seats, and which has means to assure that it will remain in the seat cavity when the stethoscope jack is removed from the control box.

An additional object of the present invention is to provide a passenger audio control box wherein slide panels fabricated from different colors may be removably secured as the face of the control box, so as to harmonize with the decor of the seat and/or the interior of the vehicle; bus, airplane or the like.

Other objects of the present invention will be pointed out in part and become apparent in part in the following specification and claims.

BRIEF DESCRIPTION OF THE DRAWINGS

Referring to the drawings in which similar characters of reference indicate corresponding parts in all the figures:

FIG. 1 is a perspective view of the new and improved passenger audio control box, FIGS. 2 and 2A are an exploded, enlarged perspective view, similar to FIG. 1.

FIG. 3 is a right side elevational view of FIG. 1.

FIG. 4 is a vertical cross sectional view, taken on line 4—4 of FIG. 3.

FIG. 5 is a detailed perspective view of a retaining clip.

FIG. 6 is a cross sectional view taken on line 6—6 of FIG. 2.

FIG. 7 is a plan view showing the passenger audio control box installed in the arm of a chair.

FIG. 8 is a right side elevational view showing the passenger audio control box installed in the arm of a chair.

DETAILED DESCRIPTION OF THE INVENTION

Referring in particular to FIGS. 1 and 2 of the drawings, there is shown a passenger audio control box, generally indicated by reference numeral 10, comprising a one piece body 11, fabricated from molded plastic or machined aluminum casting. Body 11 comprises a top wall 12 having an upstanding upper parallel front projection 13 provided with an edge 14 and a rear parallel depending projection 15 provided with an upper rear groove 16. An integral depending front wall 17 projects downwardly from top wall 12 and is integrally connected to a bottom wall 18. Front wall 17 in cooperation with top wall 12 and parallel front projection 13 provides an upper front groove 20. A lower parallel front projection 21 integrally connected to bottom wall 18 provides a lower front groove 22 in cooperation with front wall 17. A lower front edge 23 is formed in lower parallel front projection 21. An upstanding lower parallel rear projection 24 integrally connected to bottom wall 18 is provided with a lower rear groove 25. Front wall 17 is provided with access openings 26, 27 for purposes which will presently appear. Both top wall 12 and bottom wall 18 are provided with recesses which are opposite and parallel on opposite sides of the respective top 12 and bottom 18 walls, forming upper left side edge 28, upper front left side face 28A and upper rear left side face 29, lower left side edge 30 and lower rear left side face 31, lower front left side face 31A, upper right side edge 32 and upper rear right side face 33, upper front right side face 33A and lower right side edge 34 (not visible) and lower right side face 35 (not visible).

A front panel 38, provided with companion openings 36, 37 corresponding to openings 26, 27 in size and shape is slidably mounted in upper front groove 20 and lower front groove 22, with the corresponding openings 26, 36 and 27, 37 aligned or in register. Front panel 38 is a decorative member to provide the proper color and texture as a front face for the present passenger audio control box. A rear panel 40 is slidably mounted in upper rear groove 16 and lower rear groove 25.

The passenger audio control box is provided with a left side member and a right side member which compliments the left side member construction.

A left side member, generally indicated by reference numeral 41, comprises a plate having two sections 42A, 42B offset to provide a vertical side edge 43 and section faces 44A, 44B. The offset is provided to enable passenger audio control box to be tipped into a wall panel opening when located in a confined space. The offset vertical side edge 43 (with reference to FIG. 6) may be two converging surfaces at an angle of 75° each from a horizontal plane such as top wall 12 and bottom wall 18. Upper rear groove 16 and lower rear groove 25 may be offset (as shown in FIG. 6) so that rear panel 40 is assembled therein at an angle of 15° to the vertical.

FIGS. 3 and 8, illustrate the offset condition in relation to the cavity 94 in the arm of a passenger seat. The upper section of offset vertical side edge 43 is at an angle of 30° in relation to the lower section. Rear panel 40 is parallel to wall panel covering surface 47B. Top wall 12 and bottom wall 18, parallel to each other are located at an angle of 75° to rear panel 40. A vertical projection 45 provided with a vertical groove 46 is integrally formed in section face 44B.

A left end face plate 47 provided with an elongated recess 47A is integrally attached to section 42A. A spring release orifice 86 is provided in end face plate 47. Left end face plate 47 provides a lower front edge extension 23A with the bottom 18A of section 42A, and upper front edge extension 14A, and a left wall panel covering surface 47B.

Similarly, a right side member, generally indicated by reference numeral 51, comprises a plate having two sections 52A, 52B offset to provide a vertical side edge 53 and section faces 54A, 54B. A vertical projection 55 provided with a vertical groove 56 is integrally formed in section face 54B. A right end face plate 57 provided with an elongated recess 47A is integrally attached to section 52A. A spring release orifice 86 is provided in end face plate 57. Right end face plate 57 provides a lower front edge extension 23A with the bottom 18A of section 52A, an upper front edge extension 14B, and a right wall panel covering surface 57B. An upper right side bracket 58 and a lower right side bracket 59 are provided in and project from section face 52A. The equivalent upper and lower brackets project from section face 44A with upper left side bracket 60 visible in FIG. 2.

Left side member 41 is placed in position with section faces 44A, 44B abutting, respectively, upper front left side face 28A and upper rear left side face 29 with vertical side edge 43 abutting upper left side edge 28. Screw 61 passes through top wall 12 and fastens in screw threads 61A located in bracket 60.

Similarly, right side member 51 is placed in position with section faces 52A, 52B abutting, respectively, upper front right side face 33A and upper rear right side face 33 with vertical side edge 53 abutting upper right side edge 32. Screw 61B passes through top wall 12 and fastens in screw threads 61C located in bracket 58.

Self tapping screws 70 pass through clearance orifices 70A in left side member 41 so as to be removably fastened in the wall of upper rear groove 16 and the wall of lower rear groove 25.

Similarly, self tapping screws 71 pass through clearance orifices 71A in right side member 51 so as to be removably secured in the wall of upper rear groove 16 and the wall of lower rear groove 25.

One of the features of the present invention is the structural configuration of the retaining spring clips, generally indicated by reference numerals 75 and 75A. Since both clips are of similar construction, only one will be described in detail. Reference is made to FIG. 5, wherein a left side retaining clip generally indicated at 75, is fabricated from spring steel and comprises a base 76, a tension leg 77 offset at an angle of approximately 23° to a vertical plane passing through the base 76, a retaining platform 78 bent at an angle of approximately 103° to the tension leg 77, and a spring release surface 80 set at an angle of approximately 120° to the surface of the retaining platform 78. A clearance surface 81 is provided to permit flexing movement of retaining clip 75, as will presently appear.

Rivets 82 passing through base 76 fasten in orifices 83 provided in plate section 42A with retaining platform passing through a window 85 located in section 42A, so that spring release surface 80 is located opposite section face 44A. The spring release orifice 86 is provided so that the retaining clip 75 may be flexed out of holding position, as will presently appear.

In service, an arm of a chair, generally indicated by reference numeral 90, comprises an arm rest 91, a face plate 92, usually of decorative character, a rear or seat wall 93, structured to provide a cavity 94. Face plate 92 is provided with an opening 95, structured to accommodate passenger audio control box 10. Front panel 38 may be of the same or complimentary decorative color to face plate 92, so that box 10 may blend into the arm of the chair 90. Edge 14 and lower front edge 23 along with left side end plate 47 and right side member 51, overly and conceal the edges of opening 95.

Retaining clips 75, 75A are depressed into control box 10, when, (with reference to FIG. 7) box 10 is pressed through opening 95. The edges of opening 95 ride against tension legs 77 until retaining platforms 78 are opposite edges, 95, when the spring or flexing quality of the retaining clips 75, 75A manifest themselves by means of the retaining platforms 78 engaging edges 95. In this manner passenger audio control box 10 is resiliently secured in the arm of a chair, such as 91.

To release passenger control box 10 from cavity 94 two screw driver blades or other flat instruments are inserted, simultaneously into spring release orifices 86 engaging spring release surfaces 80 to flex them toward each other and away from edges 95. Box 10 is then gently pulled out of cavity 94.

Having shown and described a preferred embodiment of the present invention, by way of example, it should be realized that structural changes could be made and other examples given without departing from either the spirit or scope of this invention.

What I claim is:

1. A passenger audio control box adapted to be mounted in a wall panel opening, comprising a body having a top wall provided with a front projection having an edge, a bottom wall having a front projection provided with a lower front edge, a front wall integrally connected to said top wall and bottom wall, a left side member having a window and a left end face plate provided with a spring release orifice, a lower front edge extension, an upper front edge extension, and a wall panel covering surface, a right side member having a window and a right end face plate provided with a spring release orifice, a lower front edge extension, an upper front edge extension, and a wall panel covering surface, two retaining spring clips, one for said left side member and one for said right side member, each retaining spring clip, comprising a base, a tension leg, offset at an angle of approximately 23° to a vertical plane passing through the base, a retaining platform bent at an angle of approximately 103° to the tension leg, and a spring release surface set at an angle of approximately 120° to the surface of the retaining platform means fastening one retaining spring clip to said left side member with the retaining platform passing through the window in the left side member, and additional means fastening the other retaining spring clip to said right side member with the retaining platform passing through the window of the right side member, and with said retaining platform parallel to said wall panel covering surface, means fastening said left side member to said top wall and said bottom wall, and means fastening said right side member to said top wall and said bottom wall.

2. A passenger audio control box adapted to be mounted in a wall panel opening, comprising a body having a top wall provided with a front projection having an edge and an upper front groove, a rear depending projection provided with an upper rear groove, a bottom wall having a front projection provided with a lower front groove and a lower front edge, an upstanding rear projection provided with a lower rear groove, a front wall integrally connected to said top wall and said bottom wall and in alignment with said upper front groove and said lower front groove, a front panel slidably mounted in said upper front groove and said lower front groove, a rear panel slidably mounted in said upper rear groove and lower rear groove, a left side member having a window and a left end face plate provided with a spring release orifice, a lower front edge extension, and an upper front edge extension, a right side member having a window and a right end face plate provided with a spring release orifice, a lower front edge extension, and an upper front edge extension, two retaining spring clips, one for said left side member and one for said right side member, each retaining spring clip, comprising a base, a tension leg offset at an angle of approximately 23° to a vertical plane passing through the base, a retaining platform bent at an angle of approximately 103° to the tension leg and a spring release surface set at an angle of approximately 120° to the surface of the retaining platform, means fastening one retaining spring clip to said left side member with the retaining platform passing through the window in the left side member, and with said retaining platform parallel to said wall panel covering surface, and additional means fastening the other retaining spring clip to said right side member with the retaining platform passing through the window of the right side member, and with said retaining platform parallel to said wall panel covering surface, means fastening said left side member to said top wall and said bottom wall, and means fastening said right side member to said top wall and said bottom wall.

3. The passenger audio control box of claim 2, wherein said left side member comprises two sections in offset relation to provide a vertical side edge comprising two converging surfaces, upper and lower, with the upper located at an angle of approximately 30° in relation to the lower and with said top wall and bottom wall parallel to each other but located at an angle of approximately 75° in relation to the rear panel, said left wall panel covering surface and said right wall panel covering surface being in a common vertical plane with said rear panel parallel to said left wall panel covering surface.

4. The passenger audio control box of claim 2, wherein said front wall is provided with preselected access openings and said front panel is provided with complimentary preselected access openings in register with said first mentioned preselected access openings.

5. A passenger audio control box adapted to be mounted in a wall panel opening, comprising a body having a top wall provided with an upstanding upper parallel front projection having an edge and a rear parallel depending projection provided with an upper rear groove, a bottom wall, an integral depending front wall projecting downwardly from said top wall and integrally connected to said bottom wall, front wall in cooperation with said top wall and said parallel front projection provide an upper front groove, a lower parallel front projection integrally connected to said bottom wall provides a lower front groove in cooperation with said front wall, said lower parallel front projection having a lower front edge, an upstanding lower parallel rear projection, provided with a lower rear groove, integrally connected to said bottom wall, a front panel slidably mounted in said upper front groove and said lower front groove, a rear panel slidably mounted in said upper rear groove and lower rear groove, a left side member having two section faces connected by an offset, a vertical projection provided with a vertical groove formed in one of said two section faces, an upper left side bracket, and a lower left side bracket integrally connected to the other of said two section faces a window in the last mentioned section face, a left end face plate, provided with an elongated recess and a spring release orifice, integrally attached to the other of said two section faces, a lower front edge extension provided in said left end face plate, a right side member having two section faces connected by an offset, a vertical projection provided with a vertical groove formed in one of said two section faces, an upper right side bracket, a lower right side bracket, integrally connected to the other of said two section faces, a window in the last mentioned section face, a right end face plate provided with an elongated recess and a spring release orifice, integrally attached to the other of said two section faces, a lower front edge extension provided in said right end face plate, two retaining spring clips one for said left side member and one for said right side member, each retaining spring clip, comprising a base, a tension leg offset at an angle of approximately 23° to a vertical plane passing through the base, a retaining platform bent at an angle of approximately 103° to the tension leg, and a spring release surface set at an angle of approximately 120° to the surface of the retaining platform, means fastening one retaining spring clip to said left side member with the retaining platform passing through the window in the left side member, and additional means fastening the other retaining spring clip to said right side member with the retaining platform passing through the window of the right side member, means fastening said left side member to said top wall and said bottom wall with said rear panel located in said vertical groove and means fastening said right side member to said top wall and bottom wall with said rear panel located in said right side vertical groove.

* * * * *